Figure 1:
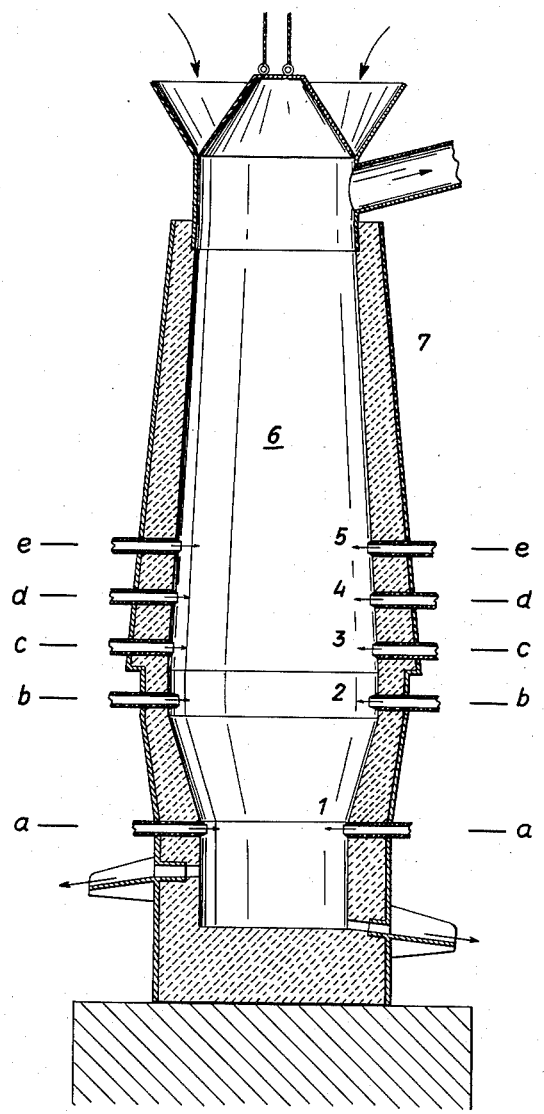

Sept. 13, 1960     O. CUSCOLECA ET AL     2,952,533
METHOD OF OPERATING A FURNACE IN WHICH THE
MATERIAL TREATED IS REDUCED
Filed Feb. 18, 1957     2 Sheets-Sheet 1

INVENTORS
O. CUSCOLECA
BY N. SJOGREN
W. PICHLER

United States Patent Office 2,952,533
Patented Sept. 13, 1960

2,952,533

METHOD OF OPERATING A FURNACE IN WHICH THE MATERIAL TREATED IS REDUCED

Otwin Cuscoleca, 47 Im Tal, Leoben-Donawitz, Austria; Nils Sjögren, 92 Pestalozzistrasse, Donawitz, Austria; and Werner Pichler, 88 Vordernbergerstrasse, Donawitz, Austria Filed Feb. 18, 1957, Ser. No. 640,850

Claims priority, application Austria Feb. 21, 1956

9 Claims. (Cl. 75—41)

The invention relates to a method of operating a furnace, particularly a stack furnace, in which the material treated is reduced, such as a metal reducing furnace, sponge iron furnace, blast furnace etc. Such types of furnaces, more particularly stack furnaces, are usually operated with solid fuels, such as coal, particularly coke. In such known types of furnaces part of the solid fuels is effective only as a reducing agent. Thus the solid fuel requirement is composed of the amount of fuel required for combustion and of the reducing agents required.

The invention resides essentially in that in such furnaces reducing gases, particularly natural gas, or oil, particularly petroleum, in an atomized, vaporized or gasified form, are blown as reducing agents replacing part of the usual solid fuel into the reaction zone of the furnace above the nozzles through which the combustion air is supplied to the furnace. This blowing of the reducing gas above the air nozzles into the reaction zone of the furnace differs basically from the operation of a furnace with gaseous fuels as such. In the latter case the gas is burnt together with the air immediately as it flows into the furnace and serves as a heat producing agent. For this reason the reducing gases or the like are blown according to the invention into the furnace at such a height above the nozzles which supply the combustion air that free oxygen is not available adjacent to the point of blowing and the reducing gases are used entirely for reducing the material being treated.

Thus the invention enables a saving of solid fuels which is of importance in countries lacking adequate solid fuel resources and where the costs of transportation are significant. Primarily the invention affords the advantage that the supply of the reducing agent in the form of reducing gases or of vaporized, atomized or gasified oils to the reduction zone enables a much better control of the process than where the furnace is fed with solid reducing agents in the form of solid fuels.

According to the invention the reducing gases or the like may be blown into the furnace from side at points evenly spaced around the periphery of the furnace in at least one horizontal plane above the air blowing nozzles. Thus the reducing agent now in the form of a gas can actually be correctly distributed over the stack cross-section and the progress of the reaction in the furnace can be influenced in a considerable degree. For instance, the progress of the reaction in the furnace may be controlled according to the invention, e.g., by the selection or deliberate variation of the temperature of the reducing gases or the like to be blown into the furnace. By an increase in the temperature of the reducing gases or the like to be blown into the furnace, the reaction can be accelerated and by a reduction of the temperature of said fluids the reaction can be retarded. The degree to which the reducing gases or the like are preheated may be predetermined for the intended process and the preheating may be effected in a simple manner in heat exchangers or recuperators. If the progress of the reaction is to be controlled so as to vary during operation it appears suitable in order to achieve a quick change in the temperature of the gases or the like to be blown into the furnace if the process is carried out in such a manner that reducing gases or the like of high and low temperatures are supplied to the furnace and the temperature level in the reaction zone is controlled by varying the proportions of the gases of high and low temperatures in the gases or the like blown into the furnace. In this connection the reducing gases or the like of high and low temperatures may be blown into the furnace in a mixture or through separate nozzles. The temperature ranges of the gases or the like to be blown in may be selected so that said gases or the like have a temperature which is higher or lower than the temperature which prevails in that height zone of the stack into which the gases or the like are blown. A temperature increase of the gases or the like to be blown into the furnace above the temperature level in said height zone of the shaft will cause an appreciable acceleration of the chemical reaction taking place there whereas, if cooler gases or the like are blown into the furnace the extent to which the reaction is retarded will depend on the magnitude of the difference between the temperatures prevailing on said stack level and the temperatures of the gases to be blown into the furnace. According to the invention the reducing gases may be preheated to the temperature prevailing in the furnace at the point of blowing or to the reaction temperature before the gases enter the furnace so that the reducing gases are made ready for the reaction before they enter the furnace.

By the selection of the height of the nozzles for blowing the reducing gases or the like in the shaft, combined with the selection of the temperature at which the gas or the like is blown in, it is possible to cause an arbitrary displacement and at the same time an intensification of the reaction zones in the stack furnace. According to the invention the reaction zone can be displaced in a simple manner by selecting or varying the height zone and/or the direction, in which the reducing gases or the like are blown into the furnace. Rows of nozzles for blowing the reducing gases or the like into the furnace may be provided in different height zones of the stack furnace. These rows of nozzles may be selectively and arbitrarily put into or out of operation so that the blowing may be effected in a higher or lower zone of the stack depending on the row of nozzles to which the reducing gases or the like are supplied. It is also possible, however, to arrange nozzles in one row but to direct them radially obliquely upwardly and/or obliquely downwardly and to supply the reducing gases selectively to the appropriate groups of nozzles. Finally, the gas stream emerging from the nozzles may be deflected upwardly or downwardly in order to displace the reaction zone. The deflection of the gas stream may be effected, e.g., by a movable arrangement of the nozzles. The invention enables also a horizontal displacement of the center of the reaction in a height zone of the furnace or an even distribution of the reaction zone throughout the stack cross-section in one height zone. According to the invention this may be effected thereby that the reducing gases or the like which are fed to the furnace in one height zone are blown in partial streams at different velocities or under different pressures. The higher the pressure in front of the nozzle or the velocity at which the reducing gas or the like discharges out of the nozzle the greater will be the penetration of the reducing gases or the like towards the center of the stack. The lower the pressure in front of the nozzle and the velocity of flow of the reducing gas or the like which is blown into the furnace the more thoroughly will the peripheral zone of the stack be supplied with gas. Such a supply of the peripheral zone with gas may also be achieved by changing the blowing direction of the nozzles towards the tangential; then the blowing may be effected at a high pressure. In this case the high pressure in fornt of the nozzle may be desirable to keep the nozzle orifice open. Thus the entire cross-section of the shaft can be controlled. According to the invention part of the reducing gases or the like may be blown into the furnace in an approximately radial direction under a higher pressure and part thereof may be blown into the furnace in an approximately radial direction under a lower pressure or also under a higher pressure but in a direction deflected towards the tangential; the ratio between said two parts may be selected to ensure an approximately even flow of the gas throughout the cross-section of the stack of the furnace.

The turbulence produced in front of the air nozzles by the air blown into the furnace can be controlled in all cases by blowing a stream of gas or the like above the air nozzles in such a degree as to achieve a uniform flow of the reducing gases or the like through the stack.

The essential effect of the present invention is to be seen in that the blowing of reducing gases into the furnace above the air nozzles, i.e., separately of the combustion air, lowers the partial pressure of $CO_2$ and thus improves the readiness of the furnace atmosphere to enter into the reaction. The fact that the reducing agent is supplied to the reaction zone according to the invention in the form of a gas or in the form of atomized, vaporized or gasified oils opens up almost unlimited possibilities for controlling of the reaction. The gaseous or similar form of the reducing agent enables a very definite and exact control of the progress of the reaction in the furnace also during the operation in any desired manner. A horizontal or vertical displacement of the reaction zone can be caused by an appropriate arrangement of the nozzles for the reducing gases, by the direction of the nozzles and by the selection of the velocities of flow in the nozzles or of the pressure of the reducing gases in front of the nozzles so as to enable a uniform flow of the gas through the furnace stack and a distribution of the reaction throughout the cross-section of the stack. The use of the gaseous reducing agent enables also a control of the intensity of the reaction in different stack cross-sections or in different parts of a stack cross-section and to correct the progress of the reaction as desired. In all cases the reducing agent is blown into a zone which lies above the air blowing nozzles and in which free oxygen is not present. The air blown into the furnace through the air nozzles is burnt directly in front of the air nozzles together with the solid fuels to form $CO_2$, which is immediately reduced to CO owing to the prevailing temperature and the free C present. Thus the blowing of the reducing gases into the furnace reduces the partial pressure of $CO_2$ formed by the reduction of metal oxide by CO and increases the reactivity of the gases without involving a consumption of solid fuel for this purpose.

According to the invention the location and size of the reduction zone in the furnace may also be controlled by blowing oxygen and/or steam into the furnace adjacent to the nozzles through which the combustion air is supplied to the furnace, particularly by admixing oxygen and/or steam to the combustion air. The addition of oxygen or hydrogen to the combustion air of stack furnaces is known per se but in the scope of the present invention that measure gives a special effect. For a given rate of gasification of C an addition of $O_2$ to the combustion air will reduce the amount of waste gases (due to a lower content of $N_2$). Whereas this gives rise to a higher temperature in the gasification or combustion zone, the rising gases are cooled much more rapidly owing to their smaller volume. For this reason the reaction zone is contracted and the temperature increased. Steam added to the combustion air to be blown in will decompose upon contact with the incandescent coke to form $H_2$ and $CO_2$. The latter is reduced to form CO when the contact with incandescent C is continued. Absorbing heat, this dissociation of the steam will lower the temperature in the reaction zone. The simultaneous formation of free $H_2$ in statu nascendi provides a gas of high reducing power. Besides, the additional gas volume (CO and $H_2$) increases the heat content of the rising gases and enlarges the reaction zone. This enables the reduction zone to be brought into the range of the nozzles for blowing the reducing gases and to maintain said zone throughout the process in the range of the nozzles through which the reducing gases are supplied if the oxygen and/or steam are supplied in the range of the nozzles for supplying the combustion air and the ratio between the oxygen and steam in the combustion air is appropriately adjusted. This measure enables a reduction of the number of the rows of nozzles required for supplying the reducing gases in the various height zones of the furnace stack or, if the number of rows of nozzles is not changed, the control of the progress of the reaction can be improved. In this manner it is also possible to adapt the location of the reaction zone to the location of the nozzles for blowing the reducing agent; this appears to be simpler than adapting the location of the nozzles to the location of the reaction zone. Above all, this permits of a greater variation and a more accurate and, above all, stepless matching of the locations of the nozzles for the reducing agent and of the reduction zone. Thus the reduction zone may be enlarged or reduced in size in order to control the conditions of the reaction. Where the combustion air is enriched with oxygen, the reduction zone in the furnace may thus be kept unchanged independently of the oxygen enrichment of the combustion air. According to the invention about 20 grams of steam are added per cubic meter of air and per percent of added oxygen. If the reaction zones are displaced due to disturbances in the operation of the furnace this control of the location and size of the reaction zone enables a very quick restoration of the reaction zones to their original location. This ensures optimum conditions for a troublefree operation of the furnace and enables the reaction zones to be displaced so as to provide optimum conditions for the blowing of the reducing gases into the furnace.

The blowing of oxygen-enriched combustion air into the furnace affords the advantage that due to the reduction of the air volume the quantities of gas entering the furnace are not unduly increased by the blowing of reducing gases or the like into the furnace. This is of special importance if reducing gases or the like of low calorific value are used. If a stack furnace which has been designed for operation with solid fuel and air and in which the solid fuel was to be used also as a reducing agent, is to be operated by the method according to the invention, the enriching of the combustion air with oxygen enables the total volume rate of the gases blown into the furnace (air, oxygen, and reducing gases or the like) to be kept approximately equal to the volume rate of air to be blown in when operating with solid reducing agents. The volume rate of the air blown into the furnace may be reduced while maintaining a constant rate of oxygen and since the entire gas volume (including the reducing gases or the like) remains the same, the gas velocity in the stack can be kept within the limits determined during the design of the furnace.

Natural gas, the methane content of which has previously been converted by incomplete combustion with a deficiency of oxygen into carbon monoxide and hydrogen ($CH_4 + \frac{1}{2}O_2 = CO + 2H_2$) may be blown according to the invention into the reduction zone as a reducing gas. Such a converted natural gas is particularly suitable as a reducing agent and the incomplete combustion of the gas before it is blown into the reduction zone affords the further advantage that the reducing gas to be blown into the furnace is preheated.

If the method according to the invention is used for the operation of a blast furnace the reducing gases are blown into the latter according to the invention in one or several horizontal planes which are spaced 0.5–16 meters, preferably 4–8 meters above the nozzles through which the combustion air is supplied to the blast furnace. For instance, if converted natural gas ($CH_4 + \frac{1}{2} O_2 = CO + 2H_2$) is used as a reducing gas, 2000–4000 cubic meters of converted natural gas ($CO + 2H_2$) may be blown per hour into a blast furnace for making 1000 tons of pig-iron per day.

The method according to the invention is primarily suitable for stack furnaces but may also be used, if desired, for rotary furnaces.

If solid fuel is used as a reducing agent in the operation of a blast furnace, as has been usual before, the following procedure may be adopted, for instance:

An ore which contains about 45% Fe in the form of $Fe_2O_3$ is charged, each charge containing 22,000 kg. ore and 100 kg. quartz being placed on 7700 kg. coke. The furnace is charged four times an hour. The throughput time, i.e., the time within which the charge is put through the blast furnace, is about 12 to 14 hours. In normal operation (when reducing gases are not blown into the furnace) the furnace produces in 24 hours 1000 tons of steelmaking pig iron and 800 kg. of coke are consumed per ton of steelmaking pig iron. Air at a temperature of 600 degrees C. is blown into the furnace at a rate of 100,000 cubic meters per hour and at a pressure of 1.2 kg./sq. cm. (gauge).

According to the method of the invention 3600 cubic meters of converted natural gas ($CO + 2H_2$) at a temperature of 900 deg. C. are blown per hour into the stack of the furnace at a pressure of 3 kg./sq. cm. (gauge) through eight additional nozzles 6 meters above the tuyères. The additional nozzles have a diameter of 30–50 mm. (corresponding to an outlet velocity of 150–200 meters per second of the reducing gases). In order to avoid an increase in the amount of gas by the additional blowing of 3600 cubic meters of reducing gases per hour and thus to keep the gas velocity in the furnace stack constant the rate of combustion air must be reduced to 96,400 cubic meters per hour and the air blown into the furnace must be enriched in $O_2$ content by 1% to 22% $O_2$. This enrichment of $O_2$ causes a contraction of the combustion zone and a rise in temperature. This temperature rise could lead to bridging in the furnace. In order to avoid this and to restore the combustion, melting and reduction zones to their original positions the moisture content of the air blown into the furnace is increased by adding 20 grams of steam per cubic meter of air. At the same time the coke charge is reduced by 900 kg. (to 6800 kg.) per charge.

Thus the coke consumption per ton of steelmaking pig iron is reduced to about 700 kg. If the gasification rate of the coke which is kept constant the output of the furnace is increased to 1100–1150 tons of steelmaking pig per day.

Figure 2:
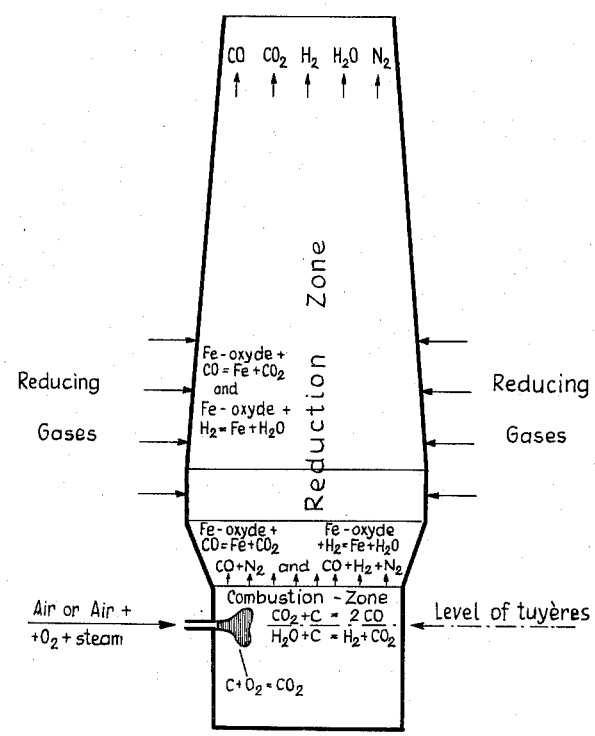

In the drawing the invention is illustrated by way of example with reference to an embodiment which shows the application of the process according to the invention to the operation of a blast furnace. The drawing shows a vertical sectional view of the stack of the blast furnace. Figure 1 structurally illustrates the type of blast furnace employed in the process whereas Figure 2 is illustrative of the reactions which take place in the zones of the furnace.

The tuyeres 1 are arranged in the usual manner in the plane a—a. These tuyeres 1 determine the combustion zone. The reduction zone is formed in the stack of the furance above said combustion zone. In the planes b—b, c—c, d—d and e—e rows of nozzles for blowing the reducing agent are provided, which consists of gases or of atomized, gasified or vaporized oils. Numerals 2, 3, 4 and 5 designate the blowing nozzles in the planes b—b, c—c, d—d, and e—e, respectively. These blowing nozzles are arranged around the stack of the furnace. The reducing gases or the like may be blown into the blast furnace stack 6 either through all rows of nozzles 2, 3, 4, and 5 or through individual ones of said nozzles.

The stack of the furnace has in the usual manner a refractory lining 7, through which the nozzles 2, 3, 4 and 5 extend. The reducing gases or the like which are blown through the rows of nozzles 2, 3, 4, or 5 may be preheated by a preheater not shown in the drawing. The temperature of said gases may be 600–1300 deg. C., preferably 800–1000 deg. C., and may be adapted to the temperature prevailing in the furnace at the point of blowing or may be higher to accelerate the reaction.

The blowing nozzles may be made of highly refractory fireclay or consist of water-cooled metal nozzles. Depending on the diameter of the furnace stack the nozzles for blowing the reducing gases must be provided in such a number as to ensure a uniform distribution of gas throughout the stack cross-section. At least four nozzles 2, 3, 4 and 5 are provided in each of the planes b—b, c—c, d—d and e—e. Up to 16 nozzles may be arranged in each of said planes.

The diameter of the blowing nozzles 2, 3, 4 and 5 should be such that the velocity with which the reducing gases are discharged by the nozzle is sufficient to ensure a uniform penetration of the furnace cross-section. The diameter of the nozzles depends on the physical character of the burden, the rate at which the reducing gases are blown into the furnace and the stack diameter of the furnace. The reducing gases are discharged from the nozzles 2, 3, 4 and 5 preferably at a velocity of 150–300 meters per second.

Oxygen and/or steam may be added as required to the combustion air to be blown into the furnace through the nozzles 1. If oxygen and/or steam are to be supplied separately to the furnace stack, special nozzles not shown in the drawing may be provided for this purpose closely beside, above or below the nozzles 1.

What we claim is:

1. A method of operating a furnace for reducing metallic ores having a combustion zone and a reduction zone, comprising supplying a solid fuel to said combustion zone, the amount of said solid fuel being being insufficient for reducing the ore treated, thereby saving a part of the solid fuel required when compared with the amount which would be required for running the furnace with solid fuel alone, blowing an amount of reducing fluid into said reduction zone which replaces said saved part of solid fuel, replacing a part of the combustion air required for the process by oxygen, the said oxygen being blown into the said combustion zone, blowing water-steam into said combustion zone, reducing the oxygen to the water-steam ratio to extend the reduction zone and increasing the oxygen content of said ratio to decrease the length of said reduction zone, thereby keeping the reduction zone in optimal position with relation to the zone where the reducing fluid is blown in.

2. A method of operating a furnace for reducing metallic ores having a combustion zone and a reduction zone, comprising supplying a solid fuel to said combustion zone, the amount of said solid fuel being insufficient for reducing the ore treated, thereby saving a part of solid fuel amount in comparison with the amount which would be required for running the furnace with solid fuel alone, blowing an amount of reducing fluid, which replaces said saved part of solid fuel amount, into said reduction zone, replacing a part of the combustion air required for the process by oxygen, the said oxygen being blown into the said combustion zone, blowing water-steam into said combustion zone, reducing the oxygen to the water-steam ratio to extend the reduction zone and increasing the oxygen content of said ratio to decrease the length of said reduction zone so that 20 g. of water-steam percent of added oxygen are blown in per cubic meter of combustion air in order to control the extension and the position of said reduction zone in the furnace thereby keeping the reduction zone in optimal position with relation to the zone where the reducing fluid is blown in.

3. A method of operating a blast furnace having a combustion zone and a reduction zone, said blast furnace being designed for operation with solid fuel alone, comprising reducing the solid fuel to an amount insufficient for reducing the ore treated, thereby saving a part of solid fuel amount in comparison with the amount which would be required for running the furnace with solid fuel alone, blowing an amount of reducing fluid, which replaces said saved part of solid fuel amount into said reduction zone, replacing a part of the combustion air required for the process by oxygen, the said oxygen being blown into the said combustion zone, blowing water-steam into said combustion zone, reducing the oxygen to the water-steam ratio to extend the reduction zone and increasing the oxygen content of said ratio to decrease the length of said reduction zone so that said reduction zone remains approximately in the same position as if the furnace were operated with solid fuel alone, the volume rate of combustion air, oxygen and water-steam and reducing fluid in totality being kept approximately equal to the volume of combustion air which would have been blown into the blast furnace when operated with solid fuel and combustion air alone.

4. A method of operating a blast furnace having a combustion zone and a reduction zone, said blast furnace being designed for operation with solid fuel alone, comprising reducing the solid fuel to an amount insufficient for reducing the ore treated, thereby saving a part of solid fuel amount in comparison with the amount which would be required for running the furnace with solid fuel alone, blowing an amount of reducing fluid, which replaces said saved part of solid fuel amount into said reduction zone, replacing a part of the combustion air required for the process by oxygen, the said oxygen being blown into the said combustion zone, blowing water-steam into said combustion zone, reducing the oxygen to the water-steam ratio to extend the reduction zone and increasing the oxygen content of said ratio to decrease the length of said reduction zone so that 20 g. of water-steam per percent of added oxygen are blown in per cubic meter of combustion air, the volume rate of combustion air, oxygen and water-steam and reducing fluid in totality being kept approximately equal to the volume of combustion air which would have been blown into the blast furnace when operated with solid fuel and combustion air alone.

5. A method according to claim 1 in which said reducing fluid is blown into the furnace in partial streams of different pressures and in different directions to ensure an approximately even flow of the gas throughout a cross section of the furnace.

6. A method according to claim 1, in which the progress of the reaction in the reduction zone of the furnace is controlled by a predetermined temperature of said reducing fluid blown into said reduction zone.

7. A method according to claim 1 in which said reduction zone is displaced by varying the height of the zone in which said reducing fluid is blown into the furnace.

8. A method according to claim 1, in which part of said reducing fluid is blown into said reduction zone in an approximately radial direction under a higher pressure and part thereof is blown into said reduction zone in an approximately radial direction under a lower pressure, the ratio between these two parts being selected to ensure an approximately even flow of the gas throughout a cross-section of the furnace.

9. A method according to claim 1, in which said reducing fluid is a natural gas, the methane of which was previously converted by incomplete combustion with a deficiency of oxygen to form carbon monoxide and hydrogen.

References Cited in the file of this patent

UNITED STATES PATENTS

| | | |
|---|---|---|
| 342,607 | Kendall | May 25, 1886 |
| 1,871,848 | Gustafsson | Aug. 16, 1932 |
| 2,395,385 | Green et al. | Feb. 19, 1946 |
| 2,593,257 | Bradley et al. | Apr. 15, 1952 |
| 2,790,711 | Selleres et al. | Apr. 30, 1957 |
| 2,793,946 | Paschal | May 28, 1957 |